Jan. 20, 1959  H B. SCHOFIELD  2,869,190
TWO-STAGE POWER APPARATUS
Filed April 18, 1956  4 Sheets-Sheet 1

INVENTOR.
H. Bruce Schofield.
BY
Wood, Herron & Evans.
ATTORNEYS.

INVENTOR.
H. Bruce Schofield.
BY
Wood, Herron & Evans.
ATTORNEYS.

Jan. 20, 1959  H B. SCHOFIELD  2,869,190
TWO-STAGE POWER APPARATUS
Filed April 18, 1956  4 Sheets-Sheet 3

INVENTOR.
H. Bruce Schofield.
BY
Wood, Herron & Evans.
ATTORNEYS.

INVENTOR.
H. Bruce Schofield.
BY
Wood, Herron & Evans.
ATTORNEYS.

2,869,190

TWO-STAGE POWER APPARATUS

H Bruce Schofield, Cincinnati, Ohio

Application April 18, 1956, Serial No. 578,918

14 Claims. (Cl. 22—68)

This invention is directed to a two-stage power apparatus for advancing the movable element of a machine through a major portion of its stroke at a rapid traverse rate, then at a relatively slow rate at high pressure to a final position.

The invention is disclosed in relation to a die casting machine having a stationary platen and a reciprocating platen, with mating die or mold sections mounted upon the two platens for relative motion to open and closed positions. The power apparatus advances the moving platen and its die section from its open position into facial engagement with the mating die section, then applies a high clamping force to hold the dies in sealed engagement to resist the pressure which is developed within the die cavity as the molten metal is charged into it. It will be understood that the die casting machine has been chosen to illustrate the principles of the invention and that the apparatus is intended for general utility in machines having a moving element which exerts high pressure or thrust at or near the limit of its working stroke, such as blanking or stamping presses, laminating machines and the like.

One of the primary objectives of the invention has been to utilize a single power motor for advancing the platen or ram of a machine under direct thrust during the first stage of its stroke and to interpose a second stage, high pressure driving connection between the motor and platen to advance it during the second stage under high pressure, but at a slow rate, to its final position.

It has been discovered that the use of the second stage, high pressure drive, makes it possible to use a relatively small fluid pressure cylinder as a source of motive power in both stages. After the cylinder has advanced the platen through the first stage, it is disconnected from the platen and connected to the second stage drive automatically to develop the high pressure during continued lineal advance.

Another objective has been to provide a two-stage power apparatus in which the second stage, high pressure thrust is developed by oppositely inclined, lineally advancing, cam surfaces, which force the intermediate joints of a pair of toggles laterally toward dead center positions, the cam being advanced by the fluid pressure cylinder and the toggle links acting endwisely in compression between the machine frame and platen.

According to this aspect of the invention, the apparatus takes advantage of the sharply increasing pressure build-up of the toggle links; moreover, the slope of the cam surfaces may be modified to create various motion-pressure characteristics during the final stage of platen movement. During a given range of motion of the toggle links (assuming a constant rate of cam advancement, with the platen against a positive stop), the resultant toggle force acting upon the platen rises sharply in proportion to the distance travelled by the intermediate toggle joints toward their dead center positions. At the same time, the velocity of platen motion decreases progressively toward zero during toggle motion toward dead center. It will be seen that if the inclined camming surfaces are modified to impart to the joints an accelerating or decelerating motion, then the rate of pressure increase will vary in accordance with the profile of the cam surface. Therefore, by proper selecting of cam profile and related toggle angles, the pressure-motion action of the platen may be varied to suit the operating conditions of the various machines.

The present apparatus has the further advantage of maintaining the final second stage clamping pressure with the single actuating cylinder deenergized at final position. For this purpose, the trailing ends of the toggle cams lead to holding surfaces which are parallel with the line of cam motion. At final clamping position, the toggle joints are near dead center and act at right angles against the holding surfaces and resist any lateral forces reacting from the platen through the toggles; hence, back pressure has no effect on the actuating cylinder during the dwell period.

Another objective has been to provide a two-stage apparatus of simple construction, utilizing the fluid pressure cylinder to advance the platen at rapid traverse rate of first stage motion, the actuating cylinder driving directly through a hydraulic coupling cylinder which automatically disconnects the direct drive by a by-pass action at the end of the first stage rapid traverse stroke and interposed the high pressure toggle-cam drive.

The releasable coupling cylinder includes a by-pass valve which is normally closed but which is tripped to an open position by valve cam at the end of the first stage of motion. When the valve is tripped, the fluid within the coupling cylinder is free to by-pass; accordingly, the coupling piston advances within its cylinder, allowing the toggle cams to advance with respect to the toggle links during the final stage.

According to the apparatus disclosed, the moving platen of the die casting machine, is traversed rapidly (first stage) by the fluid pressure cylinder, the by-pass valve of the coupling cylinder being closed so that the liquid in the cylinder acts as a solid column to transmit the lineal motion of the piston to the platen. The inclined toggle cams are mounted upon a cross head slidably carried by the machine frame and permanently connected to the actuating piston rod. The toggle links, preferably arranged in two sets on opposite sides, are arranged to fold inwardly toward one another from opposite sides when the moving platen is retracted.

As the platen is traversed through the first stage, the cross head moves in unison with the platen; at the end of the first stage, a stationary valve tripping element located in the motion of the by-pass valve, shifts the valve to its open position. When this occurs, the toggle links will have partially unfolded toward a straight condition and the inclined cams of the cross head will have advanced to a position presenting their leading ends to the intermediate toggle links. When the components reach this position in the cycle, the meeting faces of dies are substantially in contact with one another and further advancement of the platen, due to the open by-pass valve, is transferred from the coupling cylinder to the inclined cams and toggle links.

Continued advancement of the actuating piston now causes the cross head to advance toward the platen (the fluid within the coupling cylinder by-passing), such that the inclined cams shift the toggle joints outwardly toward their dead center position, thus advancing the platen through its second stage high pressure working stroke. At final position, the toggle joints preferably remain slightly out from dead center to create a self-release action at the start of the die-opening cycle.

In the die casting machine which is selected to demonstrate this principle, the meeting faces of the die are substantially in contact when the coupling cylinder transfers control to the cams and toggles, and the transfer occurs at a point approximately mid-way along the over-all lineal path of motion of the cross head. Accordingly, approximately one-half the total stroke of the actuating piston is utilized to advance the mold sections approximately into contact with one another, while the second half of the piston motion is utilized to take up the slight clearance existing between the meeting faces of the molds and to develop the final high pressure clamping force.

The relatively minute range of final travel varies according to the size of the machine, mold design and the stretching of the machine frame under tension forces developed under final clamping pressure. These variable factors are compensated by suitable adjustment, preferably in the tie rods of the press frame to change the relative spacing between the meeting faces of the mold sections or dies.

The die casting machine clearly illustrates the mechanical advantages of the apparatus, since its final second stage die closing motion is very slight, but the clamping pressure must be very great in order to withstand the tremendous expansion impulse as the molten metal is charged into the dies. As noted earlier, the parallel holding surfaces of the cams, in the present apparatus, lock the dies in a positive manner without requiring pressure from the power cylinder.

To summarize briefly, the present apparatus has a great many advantages over the conventional hydraulically operated machines. First, the apparatus is extremely simple by comparison with the complex high pressure hydraulic pumping and supply systems, and may be operated, if desired, directly from the air supply lines which are available in most manufacturing plants.

Secondly, the apparatus shifts the platen over the major portion of its stroke at a rapid traverse rate, both in closing and opening the dies, whereas the conventional hydraulically operated press necessarily shifts the platen at a slow rate because of the limitation of hydraulic fluid flow rates and large diameter actuating cylinders in constant connection with the platen. In the two-stage apparatus, the actuating cylinder is disconnected from the low ratio drive during traverse and simply shifts the platen as a freely sliding element during traverse motion.

Thirdly, in the present apparatus, the clamping pressure does not depend upon the actuating cylinder; instead the pressure is maintained by the self-holding action of the cams and toggles. This makes it possible to operate a battery of presses from a single supply of air or hydraulic pressure, the machines requiring no pressure during their high pressure dwell period. Accordingly, all of the supply is available to the machine which is executing its cycle in opening or closing direction.

As applied to blanking, stamping or laminating operations noted earlier, the pressure-motion of the platen may be regulated to suit the required working conditions, by imparting to the camming surfaces a profile, either linear or curved, which creates the required toggle action and attendant clamping pressures. The cam and toggle mechanism therefore, adapts the apparatus to various types of machines other than those noted.

Various other features and advantages of the invention are described in the following description taken in conjunction with the drawings.

GENERAL ARRANGEMENT

As noted above, the structure shown in the drawings illustrates the invention as applied to a die press used in die casting metal products. The exact construction of the dies, and certain details of the press, which are not material to the invention, have been omitted entirely or shown somewhat in diagrammatic form.

Figure 1:
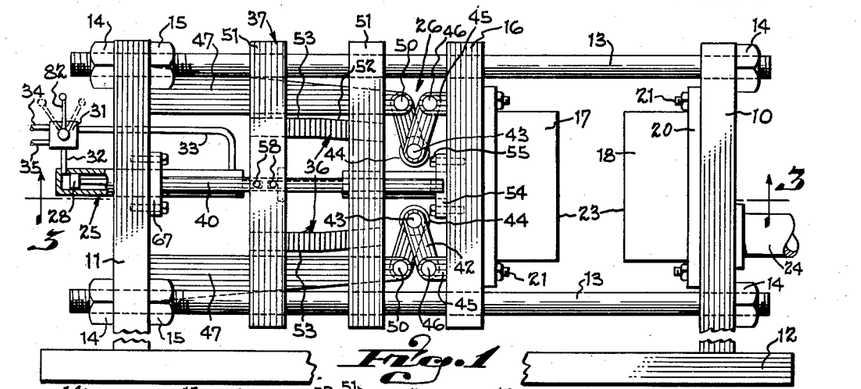
Figure 1 is a side elevation of a die press illustrating the principles of the invention, the mechanism being shown in the die open position.

Referring to Figure 1, the press assembly comprises the end plates 10 and 11 rising upwardly from a base plate 12 and secured together by tie rods 13, which in the present example, are four in number. The tie rods include nuts 14 threaded upon opposite ends engaged against the end plates. End plate 11, which mounts certain of the components of the press as explained later, is clamped by nuts 15 and may be adjusted relative to the opposite end plate 10.

The base plate, end plates, and tie rods form the essential parts of the press frame and are of heavy construction suitable to withstand the heavy pressures which are developed during the die casting cycle. It will be understood that the frame structure, so far described, may be mounted in an upright position instead of the horizontal position illustrated, depending upon the intended service.

Figure 2:
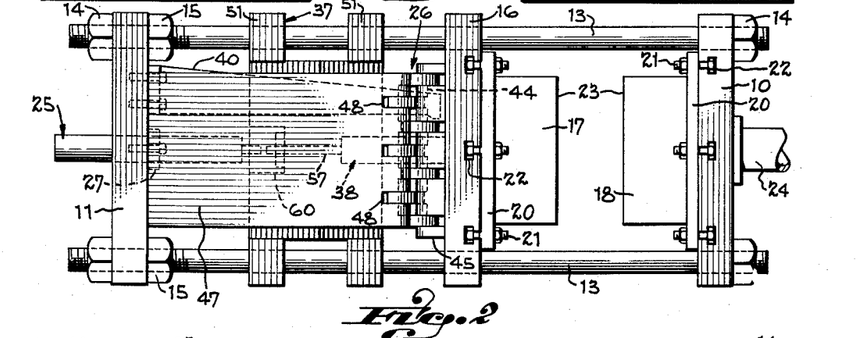
Figure 2 is a top plan view as projected from Figure 1.
Figure 8:
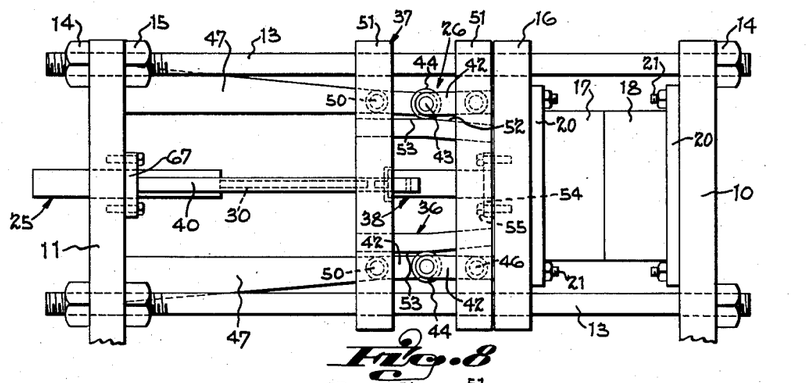
Figures 8, 9 and 10 are diagrammatic views showing the parts in final, high pressure die clamping position.
Figure 9:
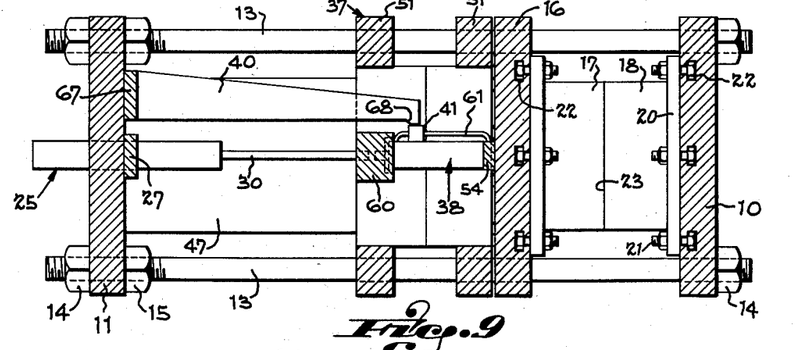

The press includes the movable platen or ram 16 slidably guided upon the tie rods 13, the platen being provided with bores for this purpose. The weight load of the movable platen may be carried upon slide ways formed on the base so as to relieve the tie rods of the weight of the platen and its die or mold section 17. The end plate 10 acts as a stationary platen for supporting the stationary mold section 18. Each mold section includes a flange 20 secured by bolts 21 having their heads confined in T-slots 22 formed in the stationary and movable platens as shown in Figure 2. The press is shown in open position in Figures 1–3, platen 16 being retracted and the mold sections separated to permit removal of the molded article from the mold cavity (not shown). The opposed faces 23—23 of the mold sections, which form the parting line, are forced against one another at high pressure when the press is shifted to die closing position as shown in Figures 8 and 9.

In the present example, the die casting press is provided with an injection cylinder indicated diagrammatically at 24 in Figures 1 and 2. This cylinder forces the molten metal into the die cavity when the mold sections are clamped in closed position (Figure 8). For this purpose, the stationary platen may include a passageway (not shown) extending from the injection cylinder to a gate or riser formed in the mold section.

During the molding cycle, the dies are closed and the melted metal, such as aluminum, brass, or alloy, is ladled into the injection cylinder by way of a well (not shown), with the injection plunger in retracted position. The injection plunger is then advanced under high pressure by means of a hydraulic ram or the like, causing the metal to be forced from the injection cylinder into the mold cavity under high pressure. When the cavity is filled, the injection ram is caused to dwell under high pressure so as to force the molten metal into intimate contact with the surfaces of the mold at a pressure of 50,000 pounds per square inch or more. As the metal is forced into the cavity, it forces or displaces the air from the cavity; then, during the high pressure dwell period, any voids which may exist within the mass of metal are forced out and the molten mass is reduced to a dense state while cooling. After the metal has partially cooled and set, the injection plunger may be retracted, then the movable platen and mold section are shifted back to the open position for removal of the molded article.

The high pressure injection technique outlined above is followed in principle in the die casting of various metals and also in the injection molding of thermo-plastic material, although the apparatus may differ in detail from one machine to the next. However, in any case, the final molding pressures, tending to separate the mold sections, are of a very high order since the area of the mold cavity is many times greater than the effective area of the injection plunger or other charging means. The mold or die sections must be clamped together under sufficient force to withstand the internal mold pressure; if they are allowed to separate even minutely, the molten material will be forced outwardly along the mold parting surface, causing excessive flashing and loss of pressure which impairs the quality of the molded article.

Power cylinder

The moving platen 16 and its die section 17 are traversed through the first stage by direct operation of the fluid-pressure power cylinder 25 which is mounted upon the end plate 11. When the platen reaches the end of the first stage (Figure 5), with the meeting faces 23 of the mold sections adjacent one another, the second stage high pressure clamping force is applied by the toggle system indicated generally at 26, which is also driven by the cylinder 25 but which multiplies the cylinder force many times. According to the adjustment of the parts, as explained later in detail, the toggle linkage may take over the load when the die faces are approximately one thirty-second of an inch apart. At this point, the center joints of the toggle levers are near a dead center position for forcing dies together under high pressure. After the toggles are actuated to final position, they form a solid mechanical connection extending from the end plate 11 to the platen, clamping the dies rigidly together under high pressure during the dwell period.

Figures 3, 4:
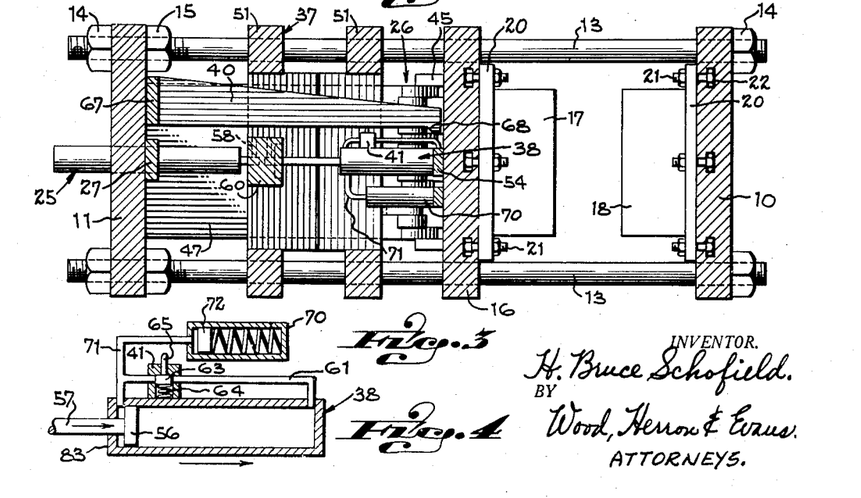
Figure 3 is a sectional view illustrating the internal components of the press as viewed along line 3—3 of Figure 1.
Figure 4 is a diagrammatic view showing the coupling cylinder and its by-pass circuit, the piston being shown in a position corresponding to the relationship of parts in Figures 1 to 3.

Referring to Figures 1–3, the power cylinder 25 may include a flange 27 attached by screws to the end plate 11, with the outer portion of the cylinder projecting through the end plate. The cylinder includes a piston 28 having a piston rod 30. The cylinder has sufficient length to shift the movable platen over the major portion of its rapid traverse stroke, as noted above, and also to actuate the toggle mechanism at final closing. In the present example, approximately half the length of the cylinder is utilized during the major travel, and the second half is employed in shifting the toggle mechanism during the final high pressure closing and clamping motion. The piston works under relatively low pressure throughout its entire working stroke. It may be operated by a low pressure hydraulic system, or if desired, by air pressure taken directly from the air lines which are available in most plants. An air pressure of 100 pounds per square inch is quite sufficient to operate the press efficiently.

As shown diagrammatically in Figure 1, a reversing valve 31, connected to the opposite ends of the power cylinder by the conduits 32 and 33, controls the movement of the platen in either direction. Hydraulic pressure is supplied to the reversing valve by the pressure and exhaust conduits 34 and 35. If air pressure is used, the exhaust conduit usually is omitted.

Toggle and cam mechanism

Figure 5:
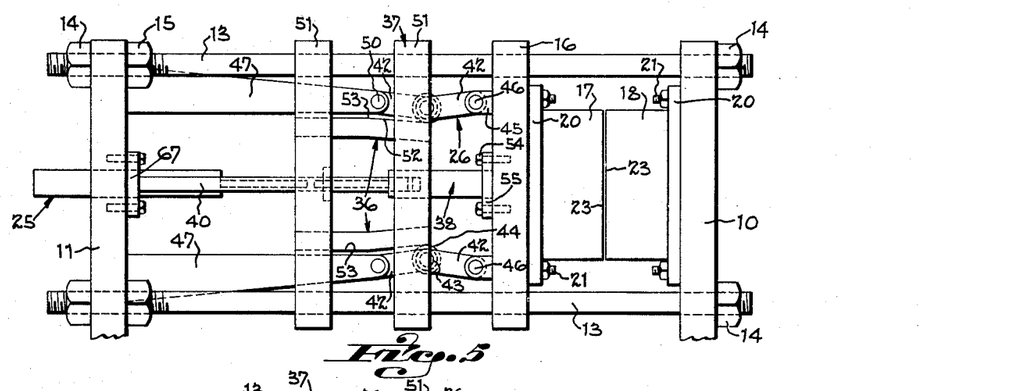
Figure 5 is a view similar to Figure 1, showing the position of the parts at the end of the first stage, immediately before the final closing pressure is applied to the dies.

Described generally, the toggle system 26 comprises two sets of toggles along opposite sides of the moving platen. The opposed toggles idle during the major portion of the stroke, but as the molds approach final position, as shown in Figure 5, they will have reached a substantially straight position. At this point, the direct connection of power cylinder 25 is broken and continued platen movement is carried out by the toggles which are engaged by the pair of lineal cams, indicated generally at 36—36. The cams are carried upon a slidable cross head 37, interposed between the moving platen 16 and end plate 11. In the present disclosure, the relative motion between the cam, cross head, and platen is provided by the releasable coupling cylinder 38 mounted upon the moving platen 16.

Figure 6:
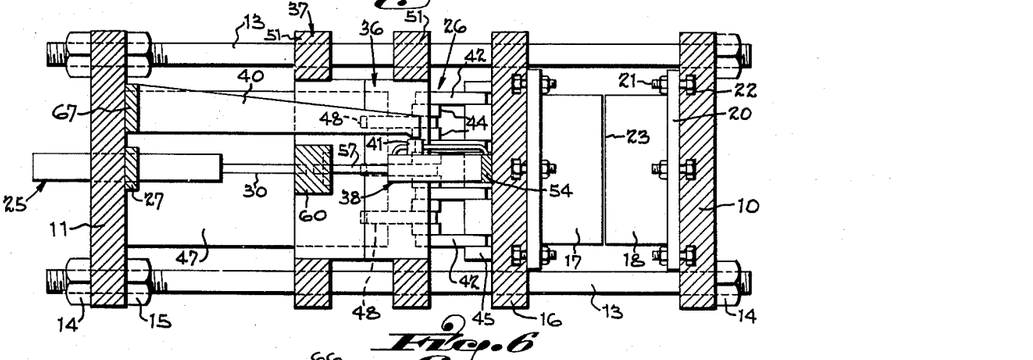
Figure 6 is a sectional view similar to Figure 3, further illustrating the action of the press at this point in the cycle.

At the end of the rapid traverse stage (Figure 6), a valve cam 40, opens the by-pass valve 41 of the coupling cylinder. This allows the main cylinder to continue advancing the cross head, the direct connection to the platen being decommissioned by the by-pass action of the coupling or compensating cylinder 38. During the second stage, the coupling cylinder 38 permits the cross head 37 to advance toward the moving platen from the position shown in Figure 6 to the position shown in Figure 9, while the lineal cams 36 are acting upon the toggle linkages 26 to generate the final pressure.

Described in detail, each toggle 26 comprises a series of opposed companion links 42—42 having inner ends pivotally carried upon a common toggle shaft 43. Cam rollers 44 are rotatably journalled upon shaft 43 between the alternate toggle links (Figure 1). The construction of each toggle 26 is identical along opposite sides of the press. As shown in Figure 2, the platen has a series of toggle brackets 45, along opposite sides, the outer ends of the companion toggle links 42 being pivotally connected to the brackets by a pivot shaft 46 passing in common through the links and brackets. The outer ends of the links 42 of each toggle are pivotally connected to a fixed bracket plate 47. Each plate 47 has its outer end attached to the end plate 11 and has its inner end slotted as at 48. The links 42 are confined in the slots and pivotally connected to the plate by a pivot shaft 50 extending in common through the links.

The mounting plates and toggle links form a solid compression structure extending from the end plate 11 to the opposite sides of the moving platen 16 when the links are shifted to their straight clamping position shown in Figure 8. The clamping pressure is resisted in tension by the tie rods 13 which connect the end plates 10 and 11 together.

The cross head 37 comprises parallel slide bars 51 arranged in pairs along opposite sides of the press and slidably carried upon the tie rods 13. The lineal cams 36 extend lengthwise and have their outer edges secured to the pairs of slide bars 51 at opposite sides by welding or other means. Each cam 36 has an outwardly facing camming surface 52 which is inclined outwardly in the forward direction of motion. Each inclined camming surface blends upwardly to a holding or locking surface 53 parallel to the line of cam motion. The inclined camming surfaces 52, at opposite sides impart to the toggles a uniform outward motion during the second stage high pressure stroke from the position of Figure 5 to the final position of Figure 8. Since the cams are opposed to one another, the lateral forces, which are developed as the toggles are cammed outwardly, substantially are neutralized; hence, the cross head serves primarily as a guide for the cams. The opposed toggles accordingly impart equal motion and force to the platen along its opposite sides.

*Coupling cylinder*

Referring to Figure 4, the coupling cylinder 38 includes a bracket 54 at its head end seated against the moving platen and secured by bolts 55. Its piston 56 includes a piston rod 57 secured by a set screw 58 to an intermediate cross bar 60 of the cross head 37. The piston rod 30 of the main power cylinder 25 is also secured to the cross bar 60 by a set screw 58, the two piston rods being co-axial. In the open position of the press (Figures 1–3) the piston 56 of the coupling cylinder resides in the position shown in Figure 4.

A by-pass conduit 61 extends lengthwise of the coupling cylinder and communicates with its opposite ends. The normally closed by-pass valve 41, including a valve plunger 63, is interposed in the by-pass conduit. The valve plunger is biased upwardly to the closed position shown in Figure 4 by a spring 64 seated beneath the plunger. An actuating stem 65 projects upwardly above the valve from plunger 63. The cylinder is filled with hydraulic fluid, such that, in the position shown in Figure 4, with the by-pass valve closed, the fluid acts as a solid column, locking the piston in its cylinder. During the first stage of platen stroke therefore, the coupling cylinder forms a solid connection extending from the piston rod 30 of main cylinder 25 to the platen, such that lineal motion is transmitted directly from power cylinder 25 to the moving platen.

Valve actuating cam 40 has a flange 67 secured to the end plate 11 and its outer end has an inclined section 68 located in the line of motion of the stem 65 of the by-pass valve. At the limit of the first stage low pressure motion, the inclined cam section 68 cams the stem downwardly to the position shown in Figures 6 and 7, thus opening the valve. During continued advancement of the cross head by the main piston rod 30, the coupling piston 56 is free to move inwardly since the hydraulic fluid now by-passes through the conduit 61, as indicated by the arrows in Figure 7.

To compensate for the displacement of piston rod 57, of the coupling cylinder, the cylinder preferably includes an accummulator indicated at 70 in Figures 3 and 4 as shown, the accummulator is attached to the moving platen by means of a flange bolted to the platen, similar to the coupling cylinder, and is connected by a conduit 71 to the rod end of the cylinder. Following conventional design, the accummulator includes a spring-loaded piston 72, such that the fluid within the coupling cylinder is held under a constant predetermined pressure. As the piston rod moves into the cylinder, the displaced fluid is forced into the accummulator, causing its spring-loaded piston 72 to compensate for the change in volume. The displaced fluid is returned to the cylinder by the spring-loaded piston during the opening cycle of the press as the piston rod moves outwardly.

*Modified coupling device*

Figures 11, 12:
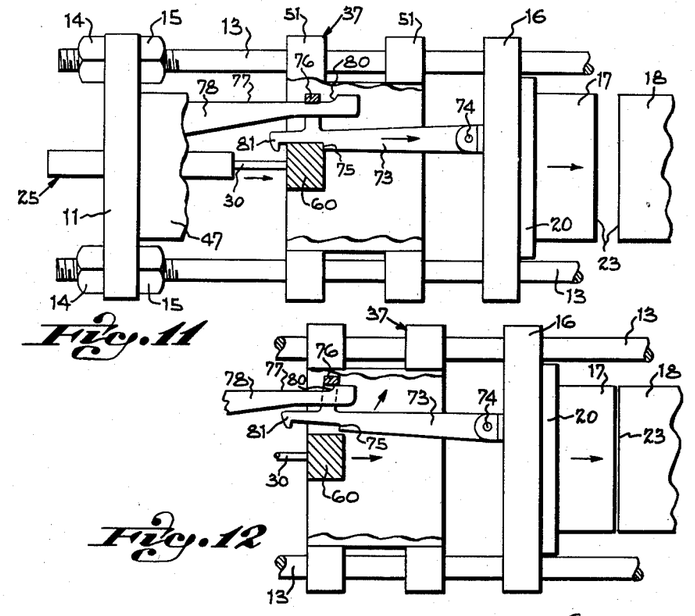
Figures 11 and 12 illustrate a modified coupling device utilizing a mechanical lever and cam to disengage the power cylinder from the platen at the end of the first stage traverse motion.

The modified coupling mechanism shown in Figures 11 and 12 performs the same function as coupling cylinder 38, but operates mechanically rather than hydraulically. As shown in Figure 11 a coupling lever 73 is pivotally connected as at 74 to the moving platen and includes a right angular driving notch 75 at its swinging end. During rapid traverse first stage motion, the notch engages the cross bar 60 of the cross head, thus providing a direct thrust drive from the cross head to the moving platen. As the parts reach the end of the first stage of motion, corresponding to the position shown in Figures 5 and 6, the swinging lever 73 is disengaged as shown in Figure 12. For this purpose, the lever includes a release yoke 76 which slide along the guide surface 77 of a stationary release cam 78.

At the end of the first stage, the surface of yoke 76 cams upwardly along the inclined surface 80 of the release cam, thus lifting the notched end of the lever and allowing the cross head to continue its advancement and actuate the toggle links during the second stage (Figure 12). When the platen is to be retracted, the cross head first shifts rearwardly until the cross bar 60 engages the hooked end 81 of the lever; thereafter, the cross bar draws the platen to its retracted position. Thereafter, the yoke 76 drops down upon the guide surface 77 of the release cam to re-engage the driving notch 75 for the next cycle.

OPERATION

At the start of a molding cycle, the reversing valve 31 is shifted toward the right as viewed in Figure 1, to admit fluid pressure into the main cylinder 25 by way of conduit 32 to drive the piston toward the right. The piston motion is transmitted to the cross head 37 and to the piston rod 57 of the coupling cylinder. Since by-pass valve 41 is closed, the motion of the main piston rod 30 is transmitted directly to the platen, causing the platen and cross head to move in unison toward the right at the first stage, rapid traverse rate. This motion continues until the die section 17 approaches the stationary section 18 (Figure 5), causing the toggles 26 to unfold to a position for actuation by the lineal cams 36.

Figure 7:
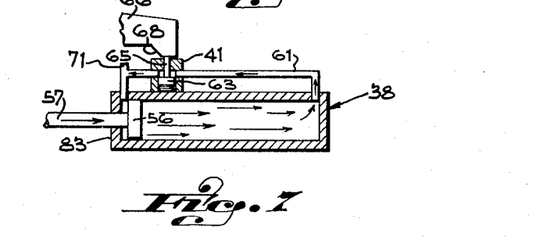
Figure 7 is a diagrammatic sectional view showing the action of the compensating cylinder when the parts assume the position shown in Figures 5 and 6.

At this point, the inclined valve cam 68 trips the by-pass valve 41 to the open position shown in Figure 7 to uncouple the platen from the cross head. During continued advancement of the cross head, the inclined surfaces 52 of the lineal cams shift the toggle rollers 44 outwardly. It will be noted that the toggle links will have approached their dead center position as the cams take over; moreover, the slope of the cams is relatively slight. Accordingly, the slight inclination of the cams, combined with the force-multiplying action of the toggles, creates an extremely powerful clamping action as the surfaces of the dies contact and are clamped against one another.

When the final clamping position is reached (Figure 8) the parts are self-holding since the parallel holding surfaces 53 of the cams have advanced to the rollers; consequently, no pressure is required on the power cylinder to hold the die sections under pressure during the charging and high pressure dwell period. It will be understood that the amount of pressure to be applied may be regulated by adjusting the nuts 14 and 15 which clamp the end plate 11 to the tie rods.

After the parts reach the position of Figures 8 and 9 the molten metal is forced under high pressure by injection cylinder 24 into the mold or die cavity to completely fill the cavity and to dwell under high pressure against the charge during the setting period, as outlined earlier. After the dwell period, the injection plunger is retracted, then the control lever 82 of reversing valve 31 is shifted to its second position to separate the mold sections.

Figure 10:
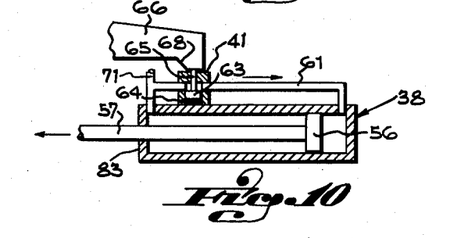

As the air pressure forces piston 28 and its rod 30 rearwardly, the by-pass valve 41 remains in open position (Figure 10) and the coupling piston 56 moves rearwardly, as indicated, due to the by-pass action. The cross head thus retracts relative to the moving platen during this portion of the cycle. As the cross head retracts, the lineal cams 36 pass outwardly from between the toggle rollers 44 until the cams clear the rollers.

When the retracting parts reach the position shown in Figure 5, the piston of the coupling cylinder has approximately reached the end of its retracting stroke and the ends of the lineal cams are now passing from between the toggle rollers. The unclamped dies remain closed, as shown in Figure 8, until the cams are sufficiently clear to allow the toggle rollers to move inwardly toward one another. At this point, the piston 56 of the coupling cylinder contacts the cylinder head 83, and thus begins to shift the movable platen and mold section toward the left in unison with the cross head.

As the coupling cylinder and platen shift toward the left, the stem 65 of the by-pass valve passes along the inclined camming surface 68, causing valve spring 64 to shift valve plunger 63 to its closed position. The valve is thus conditioned for the next cycle as the parts shift back to the full open position (Figure 1) for removal of the molded article from the separated mold sections. The stationary mold section may include the usual ejector pins for dislodging the article from the mold cavity.

To summarize the cycle briefly, the apparatus advances through its closing cycle in an automatic sequence in response to actuation of the manual control valve in mold closing direction. As the mold parting surfaces approach final position, the cam actuated by-pass valve automatically transfers the drive from the air cylinder to the cam operated toggles which then apply the final high pressure clamping force, taking advantage of the power-multiplying action of the lineal cams and toggles. When the control valve is actuated manually to separate the mold sections, after the mold charging and dwell period, the apparatus executes its cycle in reverse order, first to release the toggles during the by-passing action of the coupling cylinder, then to shift the cross head and movable platen back to the starting position ready for the next operating cycle.

Figure 13:
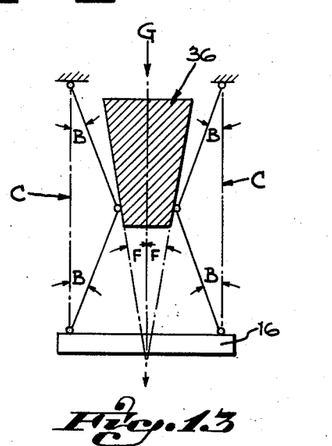
Figure 13 is a diagram of the cam and toggle links illustrating the application of forces.

The diagram shown in Figure 13 is intended to depict the action of the compound toggle and cam system during the high pressure stroke. To illustrate the application of forces more clearly, the angle of the toggle links has been increased substantially over the limits shown in the mechanical views of the press. It will be understood that the toggles at both sides of the platen perform the same amount of work. They are arranged in pairs to equalize the force applied along opposite sides of the platen and to neutralize the lateral forces acting against the camming surfaces.

Figure 14:
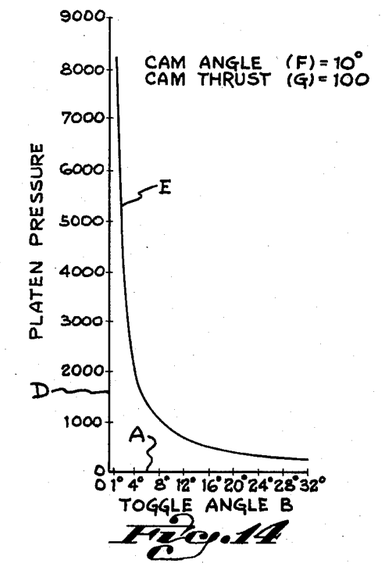
Figure 14 is a graph showing the pressure exerted upon the platen as the toggle links move toward their dead center position in response to their cams.

The graph shown in Figure 14 illustrates the rising platen pressures developed by the toggle-cam system according to Figure 13. The toggle angles indicated in degrees along horizontal coordinate A of the graph, represent the angles B of the toggle links, as measured from the dead center line C, in Figure 13. The pressure factors of the vertical coordinate D represent the reaction of both links at progressively decreasing angles. Theoretically, the toggle action is the same for one or a pair of toggles; hence, the curve E represents the pressure developed by one or both toggles.

The diagram and graph are based upon a cam angle F of 10 degrees to bring out the principles as clearly as possible. In actual practice, the cam angle may be greater or less.

To more clearly show the sharp rise in pressure, the curve E of the graph has been plotted from a starting toggle angle B of 32 degrees. In practice, the toggle stroke preferably is initiated when the links have reached an angle B in the neighborhood of 8 or 10 degrees, depending upon the utility of the machine. It will be observed that the starting toggle angle B, coacting with cam angle F, governs the range of final stage clamping motion and magnitude of pressure.

As noted earlier, the cam angle F may be modified to create the desired platen action and pressure during the second stage, according to the dictates of the machine. For example, if the platen acts against a compressing material and requires a heavy final pressure, then a fairly steep leading portion may be imparted to the cam for the required closing motion, blending into a decreased slope at the trailing portion for the final high pressure dwell. Other stroke characteristics may be obtained by imparting to the cam surfaces a curving profile, either concave or convex, with variations in curvature if required.

The graph of Figure 14 is based upon a hypothetical constant cam thrust G of 100 pounds and constant rate of advancement. Assuming that the advancing cam is arranged to contact the toggles when they have unfolded to the 8 degree toggle angle B shown on the graph, with the platen theoretically against a positive stop, then an initial platen pressure of 1,000 pounds is developed, as indicated along the coordinate D. As the cam advances the toggles to the 4 degree angle, platen pressure rises to 2,000 pounds; thereafter, the curve rises sharply to 8,000 pounds pressure by the time the toggle links have reached an angle of approximately 1 degree. Beyond the 1 degree point toward zero or dead center, the curve E blends toward the straight line indicated in the graph. As noted above, the platen pressures have a high rate of gain as the cam angles are decreased in accordance with performance requirements.

In actual practice, the links are not advanced completely to dead center since they become self-locking at this point. In other words, the holding surfaces 53 of the cams lock the toggles at final position without reacting against the power cylinder; therefore, the toggles fold inwardly of their own accord as the cam is withdrawn during the retracting stroke.

The graph and toggle diagram are intended to clarify the principle of operation and mechanical advantages thereby obtained. In practice, the cam angle or angles can readily be calculated to create a mechanical advantage in terms of cam thrust and corresponding platen pressure, in excess of 100 to 1; therefore, a relatively low pressure actuating cylinder is quite practical as a power source.

Having described my invention, I claim:

1. A two-stage power apparatus comprising, a movable machine element, a fluid pressure power cylinder having a piston rod which is shiftable in forward and reverse directions, a hydraulic coupling cylinder, said coupling cylinder including a piston and a normally closed by-pass system communicating with the cylinder at opposite sides of the piston, the said coupling cylinder and piston being relatively connected to the movable element and piston rod of the power cylinder, said coupling cylinder and piston providing a direct driving connection between the piston rod and movable element during a first stage of motion of the piston rod, means for opening said by-pass system at a limit of first stage motion of the piston rod and movable element, thereby providing relative movement of the piston and coupling cylinder and allowing the piston rod to advance relative to the movable element, a second stage driving connection interposed between the piston rod and movable element providing a reduction driving connection therebetween, said second stage driving connection shifting the movable element at a reduced rate in proportion to the rate of piston rod motion, thereby shifting the movable element at a slower rate under higher pressure toward a final position.

2. A two-stage power apparatus comprising, a machine frame having a movable element shiftably mounted thereon, a power motor having lineally movable thrust means, a releasable coupling device interposed between the thrust means and movable element and providing a direct first stage driving connection therebetween, trip means engageable with the coupling device for releasing the same at a limit of first stage motion, thereby providing movement of the thrust means toward the movable element, a toggle having opposite ends pivotally connected to the machine frame and movable element and including an intermediate toggle joint, cam means connected to the thrust means for movement therewith, said cam engageable with the intermediate toggle joint during the movement of thrust means toward the movable element, said cam forcing the intermediate toggle joint laterally toward a dead center position and thereby advancing the movable element through a second stage of motion at a slow rate under higher pressure.

3. A two-stage power apparatus comprising, a machine frame, a moving platen carried upon the frame for lineal motion, a power motor mounted upon the machine frame and having thrust means projecting toward the platen, a hydraulic coupling cylinder mounted upon the platen and having a piston connected to the said thrust means, a by-pass circuit communicating with the coupling cylinder on opposite sides of the piston thereof, a normally closed by-pass valve in said circuit, said valve having a shiftable actuating element for opening the same, said coupling cylinder providing a direct hydraulic connection between said thrust means and platen during advancement of the platen through a first stage of motion when the valve is closed, stationary trip means located in a position to engage and shift said valve actuating element to an open position at a given point along the first stage motion of the platen, thereby to open said by-pass circuit and release the direct hydraulic drive of the coupling cylinder, and a leverage system interconnecting the thrust means to the platen and providing a leverage reduction from the thrust means to the platen, said leverage system advancing the platen at a slower rate under higher pressure during a second stage of motion.

4. A two-stage power apparatus comprising, a machine frame, a movable machine element slidably carried on the frame and movable from a retracted to a final position, a fluid pressure cylinder mounted on the frame and having a piston rod movable lineally, a releasable coupling device, a shiftable driving member in the coupling device connected to the piston rod, shiftable locking means on said coupling device normally latching the shiftable driving element therein and providing a direct driving connection from the piston rod to the movable machine element, said piston rod thereby advancing the movable machine element at a rapid traverse rate of first stage motion, a stationary trip device mounted on the machine frame and located in the path of motion of the locking means of the coupling device in a position to shift said locking means to a release position at a limit of said first stage rapid traverse motion, a toggle having opposite ends pivotally connected to the machine frame and to the movable machine element, said toggle including an intermediate toggle joint, said toggle joint moving outwardly from the axis of the piston rod during the said first stage motion, and a cam in driving connection with the piston rod, said cam being engageable with the toggle joint upon advancement of the piston rod and movable machine element to the said limit of first stage motion and forcing the toggle joint outwardly toward a dead center position, thereby advancing the movable machine element through a second stage of motion at a slower rate under higher pressure to the said final position during the final stage of motion of the movable element toward the said final position.

5. A two-stage power apparatus comprising, a machine frame, a movable machine element slidably carried on the frame and movable from a retracted to a final position, a fluid pressure cylinder mounted on the frame and having a piston rod movable lineally, a releasable coupling device, a shiftable driving member in the coupling device connected to the piston rod, shiftable locking means on said coupling device normally latching the shiftable driving element therein and providing a direct driving connection from the piston rod to the movable machine element, said piston rod thereby advancing the movable machine element at a rapid traverse rate of first stage motion, said first stage motion being carried out through substantially half the total lineal motion of the said piston rod, a stationary trip device mounted on the machine frame and located in the path of motion of the locking means of the coupling device, in a position to shift said locking means to a release position at a limit of said first stage rapid traverse motion, a toggle having opposite ends pivotally connected to the machine frame and to the movable machine element, said toggle including an intermediate toggle joint, said toggle joint moving outwardly relative to the axis of the piston rod during the said first stage motion, and a cam in driving connection with the piston rod, said cam being engageable with the toggle joint upon advancement of the piston rod and movable machine element to the said limit of first stage motion and forcing the toggle joint outwardly toward a dead center position, thereby advancing the movable machine element through a second stage motion at a slower rate under higher pressure to the said final position during the second half of the total lineal motion of the piston rod.

6. A two-stage power apparatus comprising, a machine frame, a movable platen carried upon said frame for lineal motion from a retracted position, a fluid pressure cylinder mounted upon the frame and having a piston rod projecting toward the platen and movable in forward and reverse directions, a releasable coupling device interposed between the piston rod and platen, said releasable coupling device providing a direct driving connection between the piston rod and platen during advancement of the platen from said retracted position, means for releasing said coupling device at a given point during the lineal advancement thereof, a pair of toggles, each of said toggles having opposed outer ends pivotally connected respectively to the machine frame and to said platen and having an intermediate toggle joint, said toggles normally folded inwardly in the retracted position of the platen and swinging outwardly in opposite directions toward a dead center position, during advancement of the platen, and a pair of toggle cams in driving connection with the piston rod, said toggle cams each having a cam surface engageable with the said toggle joints when the coupling device is released, said piston rod thereafter advancing the cams relative to the platen and said cam surfaces forcing said toggle links outwardly toward a dead center position, thereby forcing the platen toward a final position at a slower rate under higher pressure.

7. A second stage power apparatus for a machine having a frame and a platen carried on said frame for lineal movement from a retracted position, said platen being movable from said retracted position at a first stage rapid traverse rate, said second stage power apparatus shifting the platen at a slow rate under higher pressure to a final position, said second stage apparatus comprising, a toggle having respective outer ends pivotally connected to the platen element and to the machine frame and having an intermediate toggle joint, a toggle cam slidably carried on the machine frame, a power motor connected to said cam for advancing the same lineally, said cam including a camming surface which is engageable with the toggle joint after the platen has been moved through said first stage of motion, said toggle thereafter advancing the platen at a slower rate under higher pressure toward the final position upon advancement of the toggle cam by said power motor.

8. A second stage power apparatus for a machine having a frame and a platen carried on said frame for lineal movement, from a retracted position, said platen being movable from said retracted position at a first stage rapid traverse rate, said second stage power apparatus comprising a pair of toggles, said toggles disposed along opposite sides of the platen, each toggle having opposed outer ends pivotally connected respectively to the platen and to the machine frame and having an intermediate toggle joint, a cross head slidably carried on the machine, power means connected to the cross head and moving the same lineally relative to the platen, a pair of lineal cams mounted upon the cross head at opposite sides, each of said cams including a camming surface which is engageable with the said intermediate toggle joints and shifting the same in opposite directions toward a dead center position during lineal movement of the cross head and cams, said toggles advancing the platen at a slow rate in proportion to the rate of advancement of the power means and under high pressure toward a final position.

9. A second stage power apparatus for a machine having a frame, a stationary surface, and a platen slidably mounted on the frame for lineal movement over a first stage of motion from a retracted position toward the stationary surface, said second stage power apparatus comprising, a motor mounted on the machine frame having a lineally movable thrust element, a toggle having outer ends pivoted respectively to the machine frame and platen, said toggle having an intermediate toggle joint, said toggle folding inwardly when the platen is in said retracted position and folding outwardly toward a generally straight dead center condition as the platen element is shifted through said first stage of motion, a toggle cam in driving connection with the thrust element of the power motor, said cam having a camming surface engageable with the intermediate toggle joint at the limit of said stage of motion of the platen, the stationary surface of the machine frame being so located that the platen advances substantially into contact therewith during the first stage of motion, said thrust element thereafter advancing said camming surfaces and forcing said intermediate toggle joint outwardly toward a dead center position during said second stage motion of the cam, thereby forcing the platen into contact with the stationary surface, said toggle thereafter applying pressure upon the platen during a final portion of the toggle joint motion toward dead center position in response to continued advancement of the camming surface by the thrust element.

10. A second stage power apparatus for a machine having a frame, a stationary surface, and a platen slidably mounted on the frame for lineal movement over a first stage of motion from a retracted position toward the stationary surface, said second stage power apparatus comprising, a motor mounted on the machine frame having a lineally movable thrust element, a toggle having outer ends respectively pivoted to the machine frame and platen, said toggle having an intermediate toggle joint, said toggle folding inwardly when the platen is in said retracted position and folding outwardly toward a generally straight dead center condition as the platen element is shifted through said first stage of motion, a toggle cam in driving connection with the thrust element of the power motor, said cam having a camming surface engageable with the intermediate toggle joint at the limit of said first stage of motion of the platen, the stationary surface of the machine frame being so located that the platen advances substantially into contact therewith during the first stage of motion, said thrust element thereafter advancing said camming surface and forcing said intermediate toggle joint outwardly toward a dead center position during said second stage motion of the cam and advancing the platen into contact with the stationary surface before the toggle joint is advanced to a dead center position, the toggle applying pressure upon the platen element during a final portion of the toggle joint motion toward dead center position in response to continued advancement of the camming surface, and a holding surface extending from the trailing end of the camming surface and engageable with the toggle joint, said holding surface being generally parallel with the line of motion of the cam and thereby locking the toggle in a final position.

11. A second stage power apparatus for a machine having a frame, a stationary abutment surface, and a platen mounted on the frame for lineal movement from a retracted position toward said stationary surface and into pressure engagement therewith, said platen element being shiftable at a rapid traverse rate through a first stage of motion from said retracted position, said second stage power apparatus comprising, a pair of toggles, said toggles disposed along opposite sides of the platen, each of said toggles having respective outer ends pivotally connected respectively to the platen and to a portion of the machine frame, said toggles each having an intermediate toggle joint, said toggles folding inwardly with their toggle joints disposed toward the central axis of the machine frame when the platen element is in said retracted position, said toggles shifting outwardly in opposite directions toward a dead center position during movement of the platen through said first stage of motion toward the abutment stationary surface of the frame, a lineally movable thrust element, a cross head slidably carried on the machine frame and driving connection with the said thrust element, a pair of lineal cams mounted upon the cross head at opposite sides thereof, said cams including a camming surface which is inclined outwardly in opposite directions from the leading ends thereof, the leading portions of said camming surfaces engaging said toggle joints and shifting the same outwardly in opposite directions during lineal motion of the cross head and cams toward the platen, said toggles shifting the platen element into contact with the stationary surface before the toggle joints have advanced to a dead center position, said cams thereafter continuing to advance said toggle joints toward said dead center position thereby forcing the platen into clamping engagement against the stationary surface, said cams having a holding surface extending from the trailing ends rearwardly in the direction of cam motion thereof, said holding surfaces being generally parallel with the line of motion of the cross head and cams and advancing into engagement with the toggle joints before the joints have been advanced beyond a dead center position, thereby locking the toggles in said clamping position.

12. A releasable coupling mechanism for a two-stage power apparatus having a frame, a platen mounted on the frame for lineal movement through a first and second stage of motion, a motor mounted on the frame having a lineally movable thrust element, and reduction drive means from the motor to the platen, said coupling mechanism comprising, a coupling cylinder mounted on the platen, a piston in said coupling cylinder connected to said thrust element, a by-pass circuit communicating with the coupling cylinder at opposite sides of said piston, a normally closed by-pass valve in said by-pass circuit, said valve including a shiftable outwardly projecting actuating element, said coupling cylinder being filled with hydraulic liquid and providing a direct driving connection from the thrust element to the platen for advancing the platen through the said first stage of motion from said retracted position, a trip element located in a stationary position in the path of movement of said valve actuating element and shifting the same in a direction to open said valve at the limit of said first stage of motion causing the hydraulic fluid to flow through said by-pass circuit and valve and causing the thrust element and piston of the coupling element to advance relative to the platen, the thrust element thereby actuating said reduction drive means and advancing the platen element at a slower rate under higher pressure during the second stage of motion.

13. A releasable coupling mechanism for a two-stage power apparatus having a machine frame, a platen movably carried by the frame, a power motor including a lineally movable thrust element, and reduction drive means from the thrust element to the platen element, said releasable coupling mechanism comprising, a cross head slidably mounted upon the machine frame and in driving connection with the thrust element, said cross head disposed between the power motor and movable platen, a laterally shiftable coupling element connected to the movable platen, an abutment surface on the cross head in driving engagement with an end portion of said coupling element, said coupling element providing a direct driving connection between the cross head to the platen during advancement of the cross head and platen from said retracted position through a first stage of motion, a stationary trip element located in the path of travel of coupling element, said trip element engaging and shifting the coupling element to a position disengaging the abutment surface of the cross head at the limit of first stage motion, said coupling element adapting the cross head to be advanced by the thrust element toward the platen upon disengagement thereof, causing the thrust element to drive the platen through the reduction drive means, thereby to advance the platen through said second stage of motion during continuous advancement of the cross head toward the platen.

14. A releasable coupling machanism for a two-stage power apparatus having a machine frame, a platen movably carried by the frame, a power motor including a lineally movable thrust element and reduction drive means from the thrust element to the platen element, said releasable coupling mechanism comprising, a cross head slidably mounted upon the machine frame and in driving connection with the thrust element, said cross head disposed between the power motor and movable platen, a coupling element having an end pivotally connected to the movable platen and projecting toward the cross head, an abutment surface on the cross head in driving connection with the outer end of said coupling element said coupling element providing a direct driving connection between the cross head to the platen during advancement of the cross head and platen from said retracted position during a first stage of motion, a stationary cam element, a cam follower mounted upon the swinging portion of the coupling element, said cam element located in the path of travel of the said follower and shifting the follower and swinging end of the coupling element to a position disengaging the abutment surface of the cross head at the limit of first stage motion, said coupling element adapting the cross head to be advanced by the thrust element toward the platen upon disengagement thereof, causing the thrust element to drive the platen through the said reduction drive means, thereby to advance the platen through said second stage of motion during continuous advancement of the cross head toward the platen.

References Cited in the file of this patent
UNITED STATES PATENTS 1,895,958    Zimarik _______________ Jan. 31, 1933